United States Patent [19]
Kuzuya et al.

[11] Patent Number: 5,859,774
[45] Date of Patent: Jan. 12, 1999

[54] STABILITY CONTROL SYSTEM FOR AN AUTOMATIC CONTROL SYSTEM

[75] Inventors: Hideki Kuzuya, Nagoya; Seiichi Shin, Kitasouma gun, both of Japan

[73] Assignee: Aisin Seiki Kabushiki Kaisha, Kariya, Japan

[21] Appl. No.: 828,777

[22] Filed: Mar. 27, 1997

[30] Foreign Application Priority Data

Mar. 29, 1996 [JP] Japan .................................... 8-104032

[51] Int. Cl.$^6$ ................................................. G05B 11/01
[52] U.S. Cl. ......................... 364/176; 364/152; 180/197; 710/41
[58] Field of Search .................................... 364/176, 152, 364/578; 701/41, 42; 180/197, 168

[56] References Cited

U.S. PATENT DOCUMENTS

| | | | |
|---|---|---|---|
| 4,720,790 | 1/1988 | Miki et al. | 701/41 |
| 5,373,911 | 12/1994 | Yasui | 701/42 |
| 5,375,057 | 12/1994 | Ackermann | 180/168 |
| 5,388,658 | 2/1995 | Ando et al. | 180/197 |
| 5,446,657 | 8/1995 | Ikeda et al. | 701/41 |

OTHER PUBLICATIONS

"Syouryoku to Jidouka" (Labor Saving and Automation, *OHM Sha*, Dec. 1992, pp. 82–84.

"PID Control Design by Model Matching in Frequency Domain", *the 17th Dynamical System Theory Symposium*, Nov. 30–Dec. 2, 1994, pp. 201–204.

"Robust Control Toolbox, Version 2.0", *the Robust Control Toolbox User's Guide*, Aug. 1992, pp. 1–2 to 2–1.

*Primary Examiner*—Reba I. Elmore
*Assistant Examiner*—Sheela S. Rao
*Attorney, Agent, or Firm*—Burns, Doane, Swecker & Mathis, LLP

[57] ABSTRACT

The invention is directed to a stability control system for an automatic control system, which includes a controlled system, a measuring unit for measuring a response characteristic of the controlled system, and a computing unit for processing the response characteristic to obtain a standard frequency transfer function and a varied frequency transfer function with a permissive variation to the standard frequency transfer function. A band division unit is provided for dividing the standard frequency transfer function and the varied frequency transfer function into a plurality of bands, respectively. A modeling unit is provided for mathematically approximating the standard frequency transfer function for each band and the varied frequency transfer function for each band, to obtain a standard approximate model and a varied approximate model, respectively. A variation computing unit is provided for computing a variation of the varied approximate model to the standard approximate model for each band. According to the variation in each band, a modern controller, e.g., H∞ controller is set, thereby to provide a plurality of modern controllers, which are processed by a parallel processing unit in parallel with each other. Then, the controlled system is actuated according to a result processed by the parallel processing unit.

5 Claims, 10 Drawing Sheets

STABILITY CONTROL SYSTEM FOR AN AUTOMATIC CONTROL SYSTEM

BACKGROUND OF THE INVENTION

1. Field of the Invention

The present invention relates to a stability control system for use in an automatic control system, more particularly to the stability control system using a modern control to ensure a follow-up performance and a stability of the automatic control system.

2. Description of the Related Arts

In general, an automatic control system is provided for operating a controlled system automatically so as to adapt it to a desired state. As for an ordinary system performed in the automatic control system, is employed a PID (Proportional, Integral and Derivative) control system which is included in a so-called classical control system. The PID control system is a control system which is processed on the basis of characteristics in a frequency domain, and can be processed as a physical quantity, so that it has been utilized in various fields for a long time.

In contrast with the classical control system, is getting popular a modern control system which is processed on the basis of characteristics in a time domain, and in accordance with a mathematical principle. The modern control system is a system which is based upon a state-space system, as explained on pages 82–83 of a Japanese publication titled "Syouryoku to Jidouka" (Labor saving and Automation), published in December, 1992 by OHM Sha, for example. In the modern control system, a Hardy space (abbreviated as "H") is proposed, and combined with "∞" (infinity) representing a norm of distance thereby to provide a "H∞ control" (H-infinity control). With respect to the norm, it is described that a distance $(X^2+y^2)^{1/2}$ on a plane (x, y) is referred to as a second norm, or "2 norm", while $|x|+|y|$ is referred to as "1 norm". Then, the "∞" is meant by "∞ norm", so that it corresponds to MAX ($|x|,|y|$), i.e., a lager one out of the absolute value on the x coordinate and the absolute value on the y coordinate is used for the norm. Accordingly, it has been proposed to apply the H∞ control to a Robust stability control, which is adapted to control a control system in a stable state, even in the case where a state-variation of the system is caused by a disturbance or the like.

As for a combination of the H∞ control and the PID control, "PID Control Design by Model Matching in Frequency Domain" was proposed in a paper (on pages 201–204) provided for "The 17th Dynamical System Theory Symposium" held in Chiba Prefecture, Japan, during Nov. 30 to Dec. 2, 1994. It is described in the paper that there was a problem when a designed H∞ controller was installed in an actual apparatus, such that its order came to be higher than the PID controller, or the like. It is further described that in view of a reliability of the controller, maintenance such as re-tuning or the like, and a cost for installation, it would be appropriate to design a controller with a simple operating principle, so that a method for reducing the order of a higher order controller would be important. Accordingly, the paper presents a method for tuning a PID control gain, by specifying a frequency response characteristic of a loop transfer function as a reference model, and matching a loop transfer function of the PID control system with the reference model. With respect to the loop transfer function used for the reference model, the paper describes that it is possible to employ the loop transfer function obtained through the H∞ control or the like. Thus, the paper proposes the reduction method for the PID controller of the higher order controller.

Also, it is described in the paper that it would be possible to designate a frequency band for the matching operation, so that the proposed method would constitute a reduction method for a controller weighted by frequency. In practice, are described a first step to design a stability controller using the H∞ control or $H_2$ control and provide the loop transfer function obtained by the controller as the reference model, a second step to hypothesize the structure of the PID controller, and a third step to obtain a gain intersection frequency and a phase intersection frequency of the reference model, and designate a frequency band for matching the loop transfer function of the PID control system (steps 4–9 are omitted, herein). Then, employing an example applied to the controlled system in a vibration system, it is concluded that the PID controller can be designed to keep the performance of the H∞ controller in part, if the matching frequency band is appropriately set.

As described before, the H∞ control relates to the least value problem of the infinity norm as defined in the complex function space called Hardy space, and requires complicated computation repeatedly, so that the controller necessarily comes to be of higher order. By simplifying the design algorithm, it has become possible to reduce the order, recently. With respect to the controlled system having a lot of singular points, however, its computing process time would be prolonged, so that its application would be difficult.

According to the method as described in the paper, the reduction could be made, but the method was to limit a frequency band for model matching with a certain H∞ controller to a range in which there is no unstable factor. Nothing is described in the paper about identification of the system, i.e., a method for obtaining the H∞ controller itself is not described. Therefore, the control having a range out of that range can not be performed. The greater that range was expanded, the farther the control would remote from that region. In order to improve the Robust stability control, a lead/lag compensator must be used together. Accordingly, the prior method is not necessarily appropriate to the controlled system having a plurality of resonance points and anti-resonance points.

After all, while the H∞ controller was used in the prior method described in the paper, the controlled system would be limited in view of the limit to the processing time, so that the application of the H∞ controller would be very limited. If priority is given to shortening the processing time in the prior method, approximate accuracy will be lessened, so that it will not be easy to harmonize them.

SUMMARY OF THE INVENTION

Accordingly, it is an object of the present invention to provide a stability control system for an automatic control system, using modern control systems including a H∞ controller for performing a fast computing process with a simple structure and without being affected by a characteristic of a controlled system, to ensure a follow-up performance and a stability of the automatic control system.

It is another object of the present invention to provide a stability control system having a modern controller to match with a classical control system easily and properly.

It is a further object of the present invention to provide a stability control system applicable to various control systems for use in an automotive vehicle.

In accomplishing these and other objects, a stability control system for an automatic control system includes a controlled system, response characteristic measuring means for measuring a response characteristic of the controlled system, and frequency response computing means for processing the response characteristic measured by the response characteristic measuring means to obtain a standard frequency transfer function having a standard frequency characteristic, and a varied frequency transfer function having a frequency characteristic with a permissive variation to the standard frequency transfer function. Band division means is provided for dividing the standard frequency transfer function and the varied frequency transfer function obtained by the frequency response computing means into a plurality of bands, respectively. Modeling means is provided for mathematically approximating the standard frequency transfer function for each band divided by the band division means to obtain a standard approximate model for each band, and mathematically approximating the varied frequency transfer function for each band to obtain a varied approximate model for each band, respectively. Variation computing means is provided for computing a variation of the varied approximate model to the standard approximate model for each band. Modern controller setting means is provided for setting a modern controller for the variation in each band computed by the variation computing means, respectively, to provide a plurality of modern controllers. Parallel processing means for processing the plurality of modern controllers in parallel with each other. And, actuating means is provided for actuating the controlled system according to a result processed by the parallel processing means.

The modern controller is a controller which is obtained in accordance with a modern control method in a frequency domain, in another word, a controller which is obtained through an adaptive problem using an infinity norm in the Hardy space. The modern controller includes a H∞ controller, $H_2$ controller, $\mu$ synthesis, or the like.

It is preferable that the frequency response computing means is adapted to compute magnitude components and phase components of the standard frequency transfer function and the varied frequency transfer function, respectively, that the band division means is adapted to divide the magnitude components of the standard frequency transfer function and the varied frequency transfer function into a first plurality of bands, and divide the phase components of the standard frequency transfer function and the varied frequency transfer function into a second plurality of bands, that the modeling means is adapted to approximate mathematically the magnitude component and phase component of the standard frequency transfer function for each band to obtain the standard approximate model of each component, and approximate mathematically the magnitude component and phase component of the varied frequency transfer function for each band to obtain the varied approximate model of each component, respectively, and that the modern controller setting means is adapted to set the modern controller according to the variation of the varied approximate model of each component to the standard approximate model of each component in one of the first plurality of bands and the second plurality of bands.

Preferably, the modern controller setting means is adapted to set the modern controller in accordance with the variation of the varied approximate model of each component to the standard approximate model of each component in a relatively narrower band between each of the first plurality of bands and each of the second plurality of bands.

The actuating means may include a PID controller, and the actuating means is preferably adapted to actuate the PID controller according to the result processed by the parallel processing means.

The stability control system may be installed in an automotive vehicle, as a rear wheel steering control apparatus for steering rear wheels in response to steering operation of front wheels of the automotive vehicle, for example.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
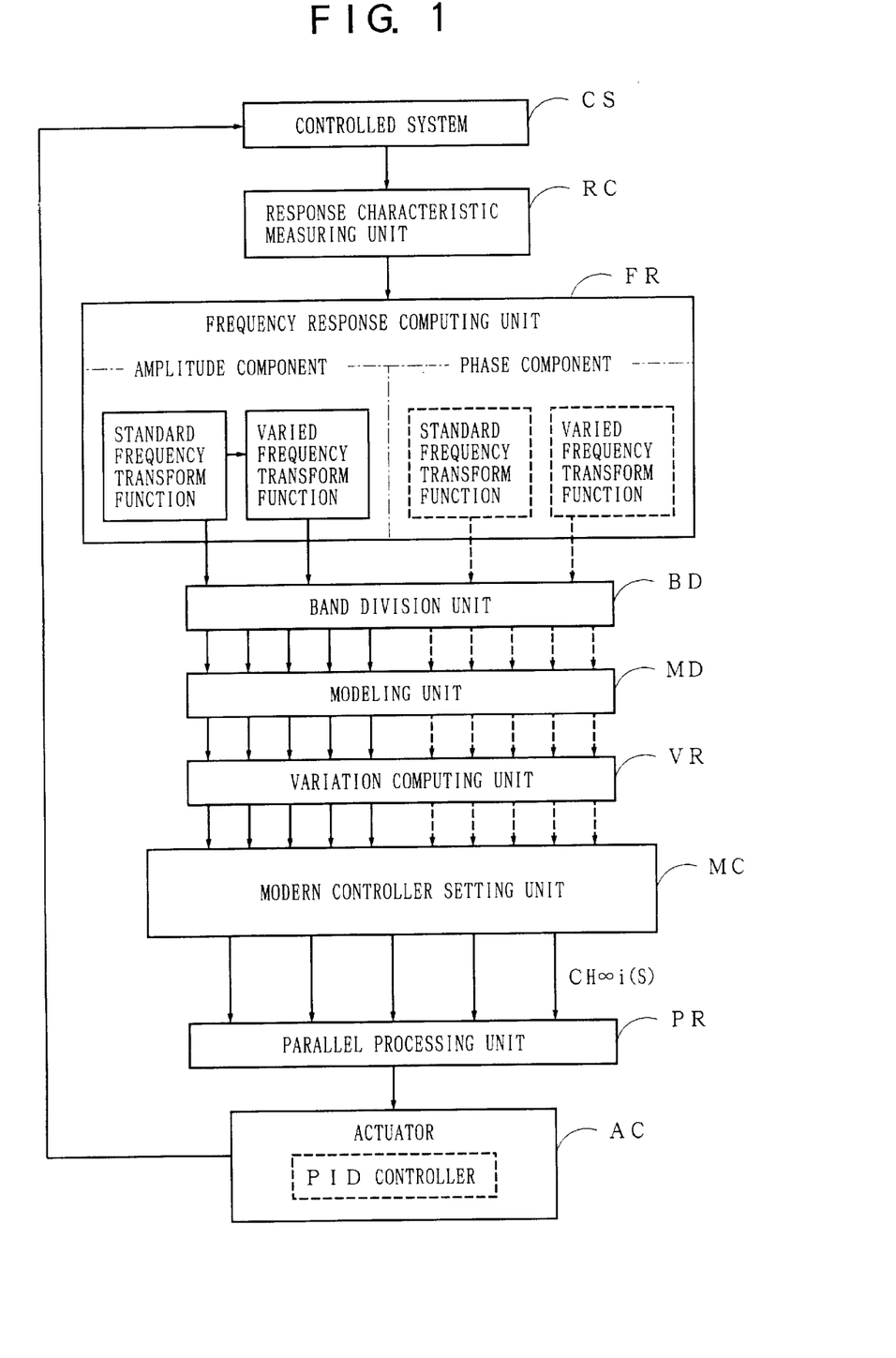
FIG. 1 is a block diagram of a stability control system for an automatic control system according to an embodiment of the present invention.

Referring to FIG. 1, there is disclosed a stability control system for an automatic control system according to an embodiment of the present invention. The stability control system includes a controlled system (CS), a response characteristic measuring unit (RC) for measuring a response characteristic of the controlled system (CS), and a frequency response computing unit (FR) for processing the response characteristic measured by the response characteristic measuring unit (RC) to obtain a standard frequency transfer function having a standard frequency characteristic, and a varied frequency transfer function having a frequency characteristic with a permissive variation to the standard frequency transfer function. A band division unit (BD) is provided for dividing the standard frequency transfer function and the varied frequency transfer function obtained by the frequency response computing unit (FR) into a plurality of bands, respectively. A modeling unit (MD) is provided for mathematically approximating the standard frequency transfer function for each band divided by the band division unit (BD) to obtain a standard approximate model for each band, and mathematically approximating the varied frequency transfer function for each band to obtain a varied approximate model for each band, respectively. A variation computing unit (VR) is provided for computing a variation of the varied approximate model to the standard approximate model for each band. A modern controller setting unit (MC) is provided for setting a modern controller for the variation in each band computed by the variation computing unit (VR), respectively, to provide a plurality of modern controllers. A parallel processing unit (PR) is provided for processing the plurality of modern controllers, in parallel with each other. And, an actuator (AC) is provided for actuating the controlled system (CS) according to a result processed by the parallel processing unit (PR). Accordingly, the reduction can be made with a simple structure, and the modern controller with small modeling error is provided. Furthermore, the processing time can be shortened, and the stable accuracy can be obtained in performing the modern control.

The frequency response computing unit (FR) may be adapted to compute magnitude components and phase components of the standard frequency transfer function and the varied frequency transfer function, respectively. The band division unit (BD) may be adapted to divide the magnitude components of the standard frequency transfer function and the varied frequency transfer function into a first plurality of bands, and divide the phase components of the standard frequency transfer function and the varied frequency transfer function into a second plurality of bands. The modeling unit (MD) may be adapted to approximate mathematically the magnitude component and phase component of the standard frequency transfer function for each band to obtain the standard approximate model of each component, and approximate mathematically the magnitude component and phase component of the varied frequency transfer function for each band to obtain the varied approximate model of each component, respectively. And, the modern controller setting unit (MC) may be adapted to set the modern controller according to the variation of the varied approximate model of each component to the standard approximate model of each component in one of the first plurality of bands and the second plurality of bands. Accordingly, the magnitude components and phase components of the standard frequency transfer function and the varied frequency transfer function will be effectively utilized for the modeling, to shorten the processing time and obtain the stable accuracy.

The modern controller setting unit (MC) may be adapted to set the modern controller in accordance with the variation of the varied approximate model of each component to the standard approximate model of each component in a relatively narrower band between each of the first plurality of bands and each of the second plurality of bands. Whereby, the modeling can be made accurately. The actuating unit (AC) may include a PID controller, and may be adapted to actuate the PID controller according to the result processed by the parallel processing unit (PR), thereby to match with the classical control of PID smoothly.

Figure 2:
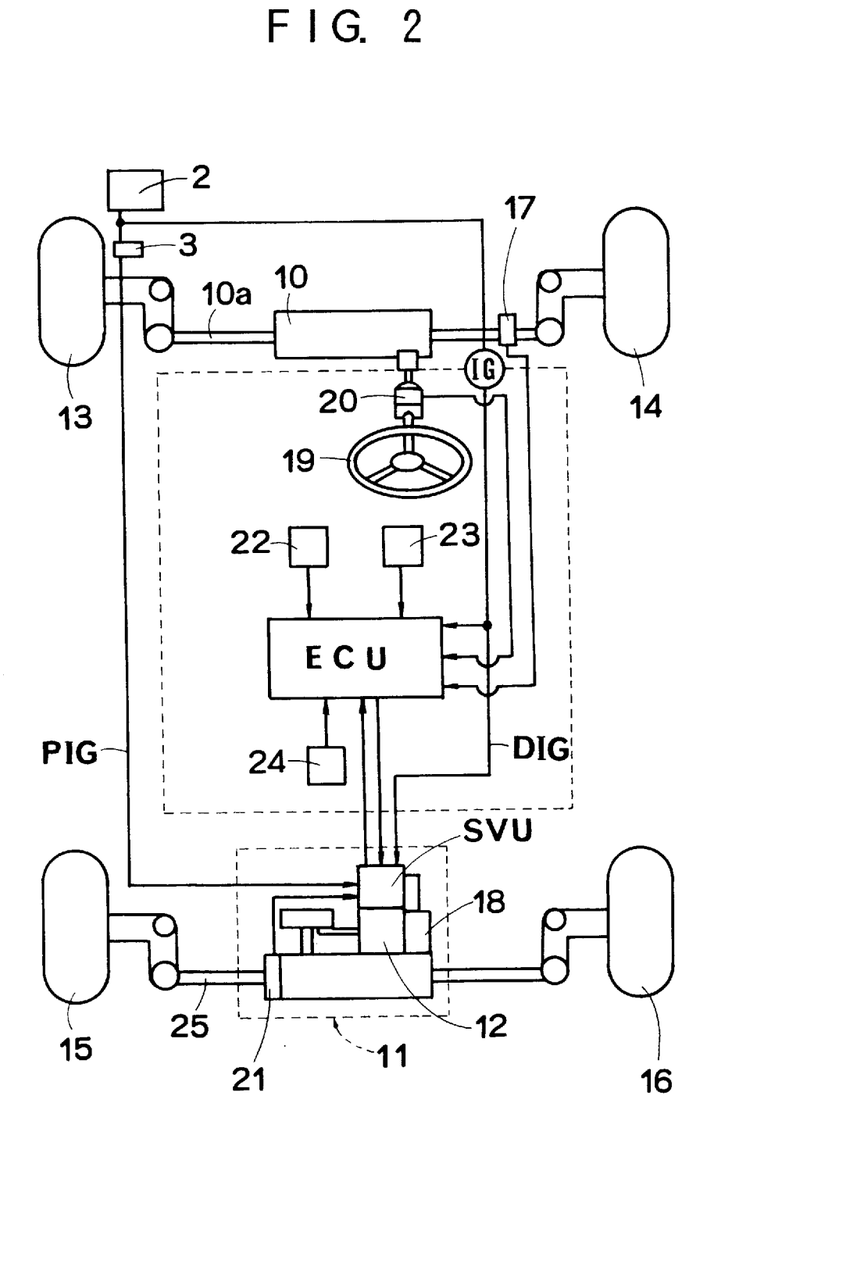
FIG. 2 is an overall diagram of a rear wheel steering control apparatus including a stability control system according to an embodiment of the present invention.

More specifically, the details of the embodiment disclosed in FIG. 1 are illustrated in FIG. 2, wherein the stability control system is applied to a rear wheel steering control apparatus which is adapted to steer rear wheels in response to steering operation of front wheels of an automotive vehicle. In FIG. 2, front wheels 13, 14 are arranged to be steered in response to rotating operation of a steering wheel 19 by a front steering mechanism 10. The front steering mechanism 10 is provided with a sensor for detecting an axial position of a rack 10a, e.g., a front steering angle sensor 17 which includes a potentiometer, and feeds its output signal to an electronic control unit ECU provided in the vehicle. On a steering shaft of the steering wheel 19, there is mounted a steering wheel angle sensor 20 which includes a rotary encoder, and feeds its output signal to the electronic control unit ECU. The vehicle is further provided with a yaw rate sensor 24 which detects a varying rate of a rotational angle (yaw angle) about a vertical axis including a center of gravity of the vehicle, i.e., a yaw angular velocity (yaw rate), to feed a yaw rate γ to the electronic control unit ECU. Also provided are a wheel speed sensor 22 which detects a rotational speed of each of the wheels, and a vehicle speed sensor 23 which is operatively mounted on a transmission (not shown) to detect a speed corresponding to a mean value of wheel speeds of the wheels operatively connected to the transmission, so that signals indicative of speeds Vw, Vm are fed from the sensors 22, 23 to the electronic control unit ECU, respectively.

A rear steering mechanism 11 is connected to rear wheels 15, 16, so as to be steered in response to rotation of an electric motor 12 which serves as an actuator according to the present invention. The rear steering mechanism 11 of the present embodiment includes a servo unit SVU, an electric motor 12, a magnetic pole sensor 18 and a rear steering angle sensor 21. The electric motor 12 of the present embodiment is a brushless three phase motor, on an axial end of which the magnetic pole sensor 18 is mounted to serve as a relative steering angle sensor for detecting a rotational angle of the electric motor 12. The electric motor 12 is so constituted to output a magnetic pole signal in response to change in magnetic pole in accordance with rotation of a permanent magnet (not shown) which is secured to an output shaft of the electric motor 12. It may be so arranged that a couple of magnetic pole sensors are provided so as to continue the steering control operation, even if malfunction occurs with respect to one of the sensors. Or, in lieu of the magnetic pole sensor 18, a conventional rotary encoder may be employed. As a device for detecting an absolute steering angle of the rear wheels 15, 16, the rear steering angle sensor 21 is provided for detecting the movement of a rack 25 of the rear steering mechanism 11. The rear steering angle sensor 21 is provided with a Hall IC, which outputs a signal indicative of a steering position in accordance with an amount of movement of a permanent magnet 21a which is mounted on the rack 25 as shown in FIG. 2. Accordingly, after a neutral position of the rear steering angle is set in response to a signal detected by the rear steering angle sensor 21, a relative steering angle is produced by the magnetic pole sensor 18. As a result, an actual steering angle of the rear wheels 15, 16 is produced by the magnetic pole sensor 18 and the rear steering angle sensor 21.

Figure 3:
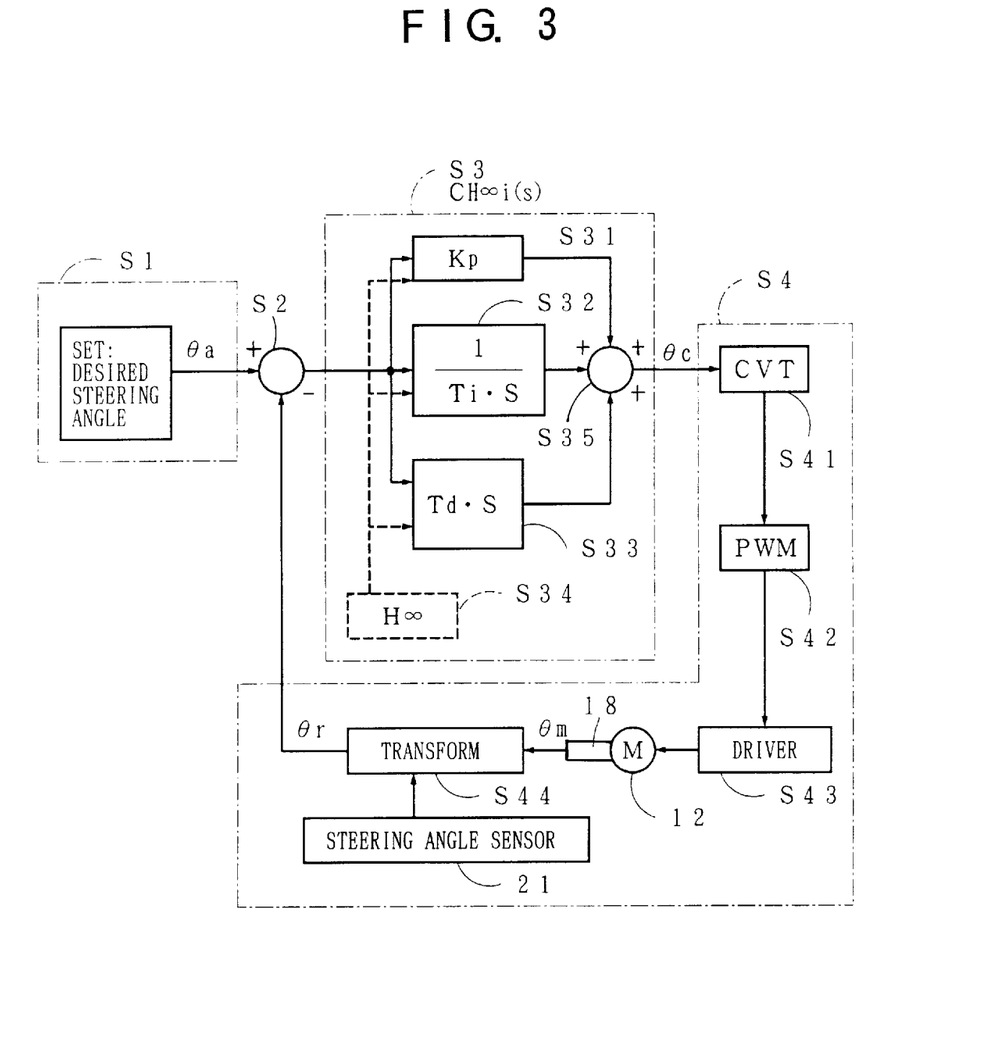
FIG. 3 is a block diagram for a servo control of a motor for use in the rear wheel steering control apparatus as shown in FIG. 2.

According to the servo unit SVU, the servo control to the electric motor 12 is performed on the basis of a desired steering angle, and in accordance with the block diagram as shown in FIG. 3. At the outset, the desired steering angle θa is provided at a target setting section S1 in the electronic control unit ECU in a conventional manner known heretofore. A rotational angle θm of the electric motor 12 is detected by the magnetic pole sensor 18 to output an actual steering angle θr, through a steering angle transforming section S44, to be fed into a subtracting section S2. The output of the magnetic pole sensor 18 is not a signal indicative of the actual steering angle, but a signal indicative of a relative steering angle. However, the output of the magnetic pole sensor 18 is modified by the output of the rear steering angle sensor 21 at the steering angle transforming section S44, so that the actual steering angle θr is output from the steering angle transforming section S44.

Accordingly, the actual steering angle θr is subtracted from the desired steering angle θa at the subtracting section S2 to produce a steering angle difference θd, which is fed to a control section S3. The control section S3 includes a proportional section S31, an integral section S32 and a derivative section S33 which are controlled by a H∞ controller S34 to perform the PID function, and which form a plurality of H∞ controllers CH∞i(S) (i=1 to n). At the proportional section S31, the steering angle difference θd is multiplied by a certain proportional gain. The steering angle difference θd is integrated at the integral section S32, and differentiated at the derivative section S33. The function of the H∞ controller S34 will be explained later in detail. Then, the results are summed up at a summing section S35 to produce a steering angle θc, which is fed to a controlled system S4, and transformed into a duty Dy at the difference-duty transformer S41 to feed the duty Dy to a pulse width modulation (PWM) section S42, which produces a pulse signal Pw in response to the duty Dy to feed the pulse signal Pw to a motor driver S43. Accordingly, the electric motor 12 is servo-controlled by the motor driver S43 in response to the pulse signal Pw. Furthermore, a blind zone applying section (not shown) may be provided to set the difference θd to be zero when the absolute value of the difference θd is smaller than a predetermined value, and terminate the control when the difference θd is small. Or, an angular limit may be applied by a steering angle limiter (not shown) to provide a controlled amount in proportion to the steering angle θc, and limit the controlled amount not to be greater than a predetermined upper limit, nor to be smaller than a predetermined lower limit.

Figure 4:
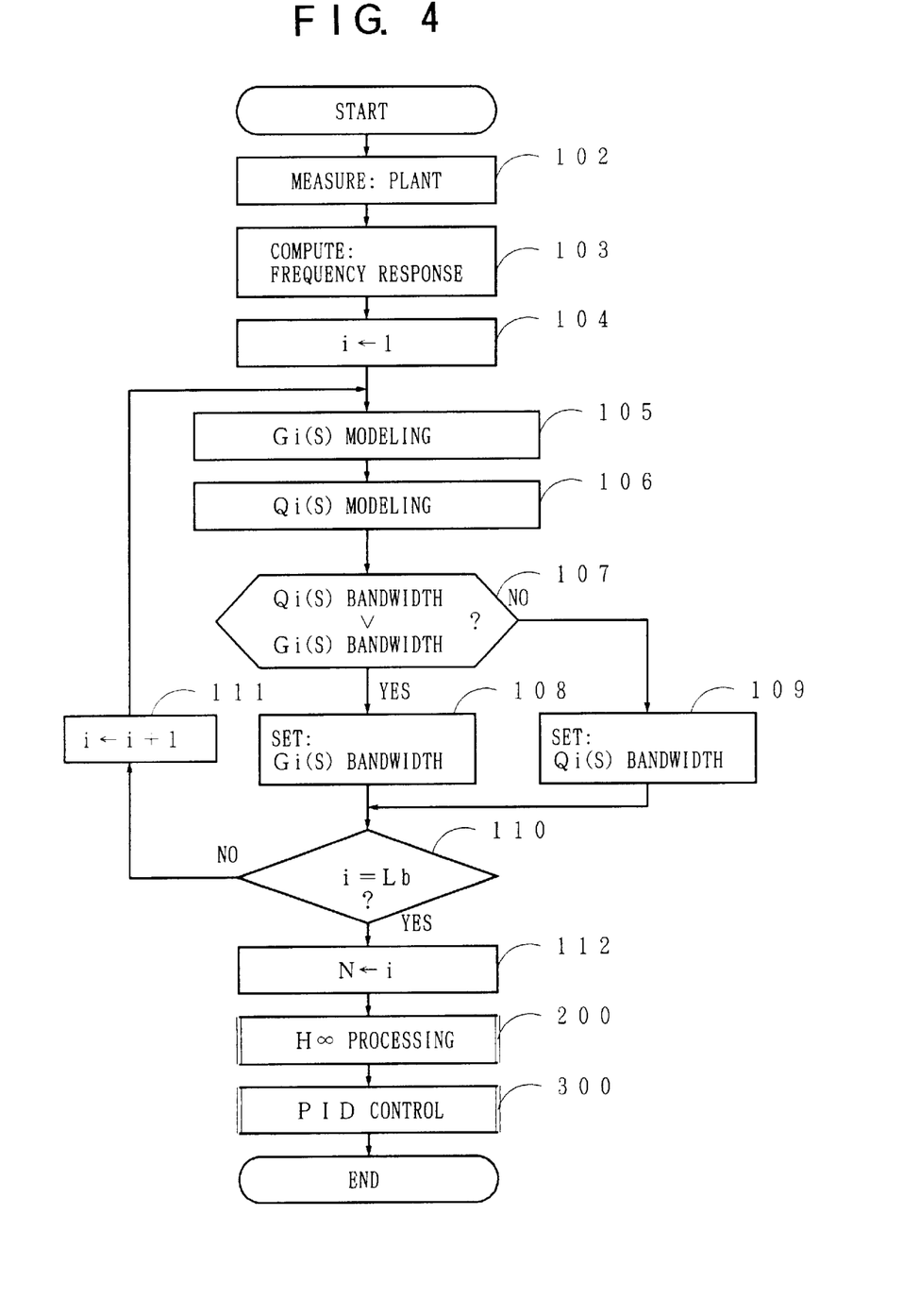
FIG. 4 is a flowchart for controlling the rear wheel steering control apparatus as shown in FIG. 2.
Figure 5:
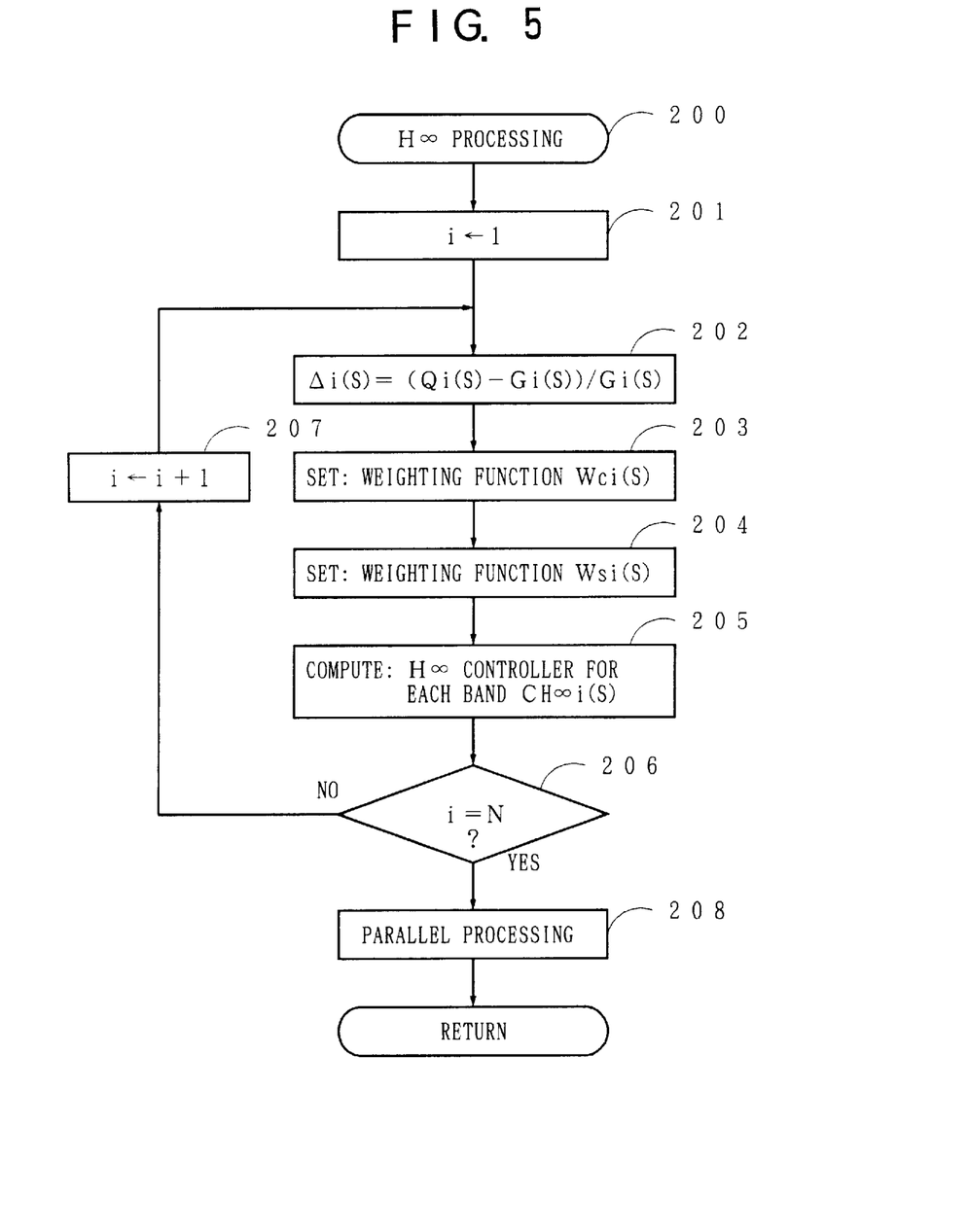
FIG. 5 is a flowchart for processing a H∞ controller in the flowchart as shown in FIG. 4.

According to the above-described embodiment, in the electronic control unit ECU, Step 300 in a flowchart as shown in FIG. 4 will be executed to perform the steering angle control as described above. Steps 102 to 200 in FIG. 4 and Steps in FIG. 5 are processed in accordance with an Off-line process, and the processed results are stored in the electronic control unit ECU in advance. These processes will be explained with reference to the flowcharts as shown in FIGS. 4 and 5.

Figure 6:
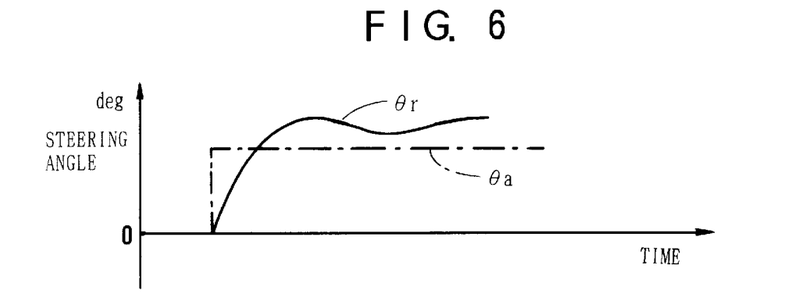
FIG. 6 is a graph showing a time response characteristic of an actual steering angle to a desired steering angle in the control of the rear wheel steering control apparatus as shown in FIG. 2.
Figure 7:
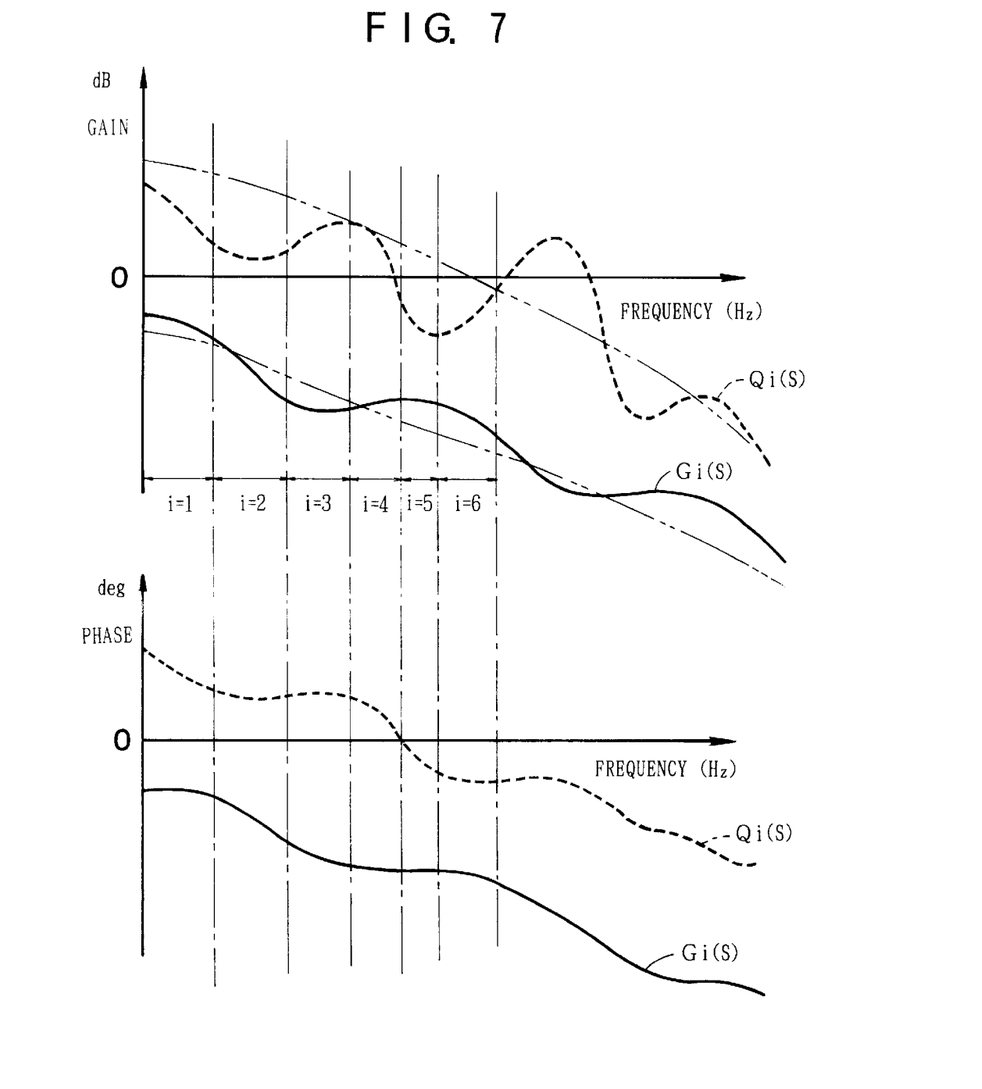
FIG. 7 is a graph showing a frequency response characteristic in the control of the rear wheel steering control apparatus as shown in FIG. 2.

At the outset, with respect to a plant which corresponds to the electric motor 12 in the embodiment as shown in FIG. 2, the response characteristics in a standard condition and a varied condition (i.e., with disturbance) are measured at Step 102. For example, various types of external forces will be applied to the actuator through a tire and a suspension system in dependence upon the vehicle driving condition, thereby to cause a disturbance load. The characteristic of the tire will change due to wear of the tire or the like, and it will change depending upon types of the tire, such as a wide tire, tempered tire, or the like. Therefore, various types of loads are applied in case of a bench test, so that the response characteristics in the standard condition and the varied condition are measured. As a result, the time response characteristic of the actual steering angle θr to the desired steering angle θa will be obtained as shown in FIG. 6. Then, the frequency response is computed at Step 103, such that the measured signal is transformed into the frequency domain by means of the Fast Fourier Transform (FFT), for example, to provide the frequency transform functions in the standard condition and the varied condition. As a result, frequency transform functions Gi(S), Qi(S) are obtained, as shown in a gain and phase diagram in FIG. 7. That is, with respect to a nominal plant (i.e., a standard plant, e.g., a plant in a normal driving condition), the frequency transform function Gi(S) as illustrated by a solid line in FIG. 7 is obtained as a standard frequency transform function. And, with respect to a maximum plant with a maximum variation, e.g., a plant in a condition where a disturbance occurred when the vehicle was travelling in the worst condition of the predictable driving conditions, the frequency transform function Qi(S) as illustrated by a phantom line in FIG. 7 is obtained as a varied frequency transform function. The "maximum" variation or "worst" condition is determined according to the controlled system, control condition, or the like. The disturbance in this case does not have to be identified by such a statistical characteristic as required in the prior theory of LQG (Linear Quadratic Gaussian). The worst disturbance may be provided within a permissive range which is determined according to specifications for design.

Next, at Step 104, "1" is given to "i" which designates an order of a control performed in each of a plurality of bands (sub-bands) which will be described later. Then, the program proceeds to Step 105 where modeling is made sequentially starting from a low frequency domain, with respect to the frequency transform function Gi(S), where i=1.

Figure 9:
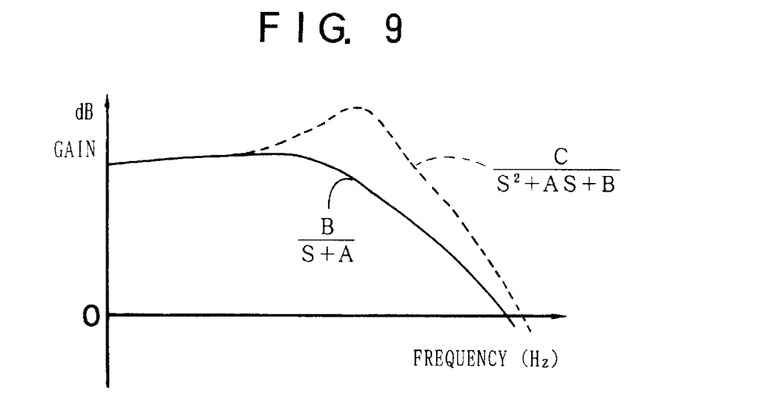
FIG. 9 is a phase diagram for explaining the structure of the present invention.

Likewise, modeling is made with respect to the frequency transform function Qi(S) at Step 106. That is, in order to approximate the frequency response of the plant of the controlled system to a mathematical model for use in the H∞ control, each of the frequency transform functions Gi(S), Qi(S) is approximated to the mathematical model of a first order lag of $B/(S+A)$ or a second order lag of $C/(S^2+AS+B)$, as shown in FIG. 9, according to a mathematical method such as the least square method.

Figure 8:
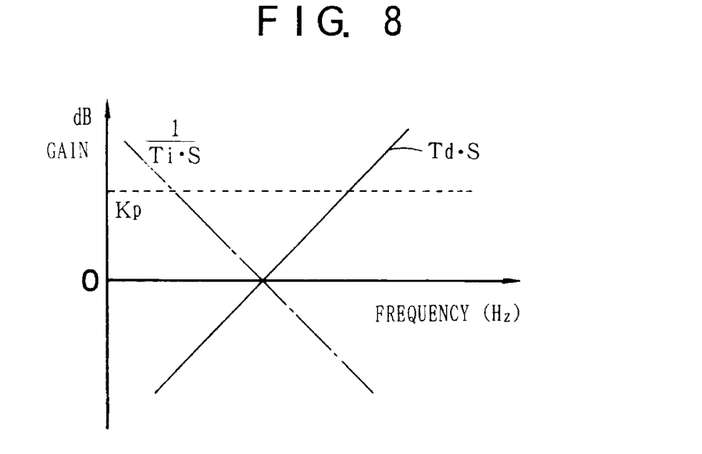
FIG. 8 is a gain diagram for explaining the structure of the present invention.

In the case where the frequency response characteristic of a plant having resonance and anti-resonance points is approximated to the mathematical model, the mathematical model will be of relatively high order. Therefore, if this approximation is used for the H∞ control, the model will be of higher order polynomial, so that its application will be difficult. On the contrary, if the frequency response characteristic is divided into a plurality of frequency bands (i) to provide a band in which the approximation to the model of a lower-order as shown in FIG. 7 can be made, it will be possible to perform a lower-order response as a whole. For example, in a certain frequency band it is approximated by an integrator whose characteristic is shown by a one-dotted chain line in FIG. 8, a differentiator as shown by a solid line, or a proportional controller as shown by a phantom line, and if a difference is caused, next band will be selected to approximate it by another integrator or another differentiator. With this method repeated in sequence it will be of a lower-order. In this case, the mathematical method such as the least square method can be used. With respect to the frequency transform function Qi(S) of the maximum plant, the same method will be performed as described above. In this respect, Gi(S), Qi(S) designate the frequency transform functions in each band (i), i=1 to n, respectively.

Figure 10:
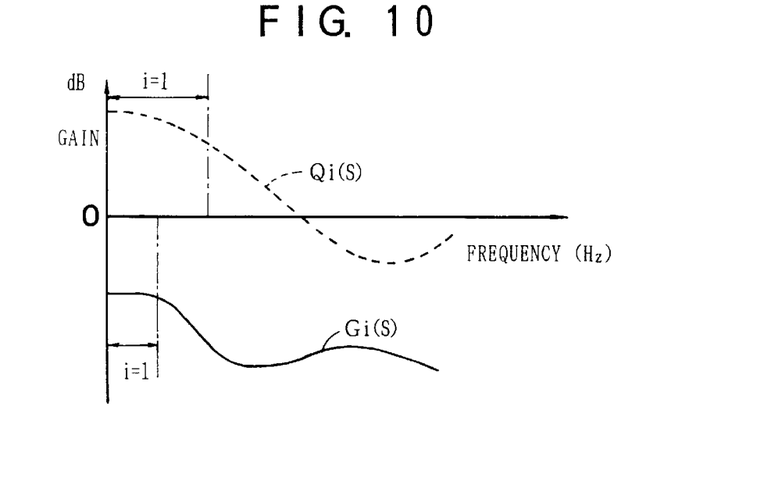
FIG. 10 is a graph for explaining determination of a bandwidth in the frequency characteristic according to the present invention.

Then, at Step 107, the bandwidth of the frequency transform function Gi(S) and that of the frequency transform function Qi(S) are compared. If they are different from each other as shown in FIG. 10, the narrower bandwidth is set thereby to ensure a stable accuracy. That is, if the bandwidth of the frequency transform function Gi(S) is narrower, the program proceeds to Step 108 where the bandwidth is set to that of the frequency transform function Gi(S). If the bandwidth of the frequency transform function Qi(S) is narrower, the program proceeds to Step 109 where the bandwidth is set to that of the frequency transform function Qi(S). Supposing that the bandwidth of the frequency transform function Qi(S) is 0.5 Hz and the bandwidth of the frequency transform function Gi(S) is 1 Hz, the former, i.e., narrower bandwidth is selected. This is because the same bandwidth is needed to obtain a regulation $\Delta i(S)$ at the following Step. As known heretofore, while two kinds of frequency characteristic are formed such as a Bode diagram including a gain diagram and a phase diagram of the frequency transform function, they can not be approximated to a model accurately in the same frequency band. In general, it is said to be preferable to select one of them in modeling according to the control condition. With respect to the H∞ control, therefore, the gain diagram is selected generally.

At Step 110, it is determined whether the program has proceeded to the last band Lb. If the result is affirmative (i=Lb), the program further proceeds to Step 112. Otherwise, the program proceeds to Step 111 to increment the band (i), and repeat Steps 105–109. Consequently, the frequency transform functions Gi(S), Qi(S) are divided into a plurality of bands (i), in each of which all the functions necessary for the H∞ control are initially set. Then, the program proceeds to Step 112 where the band (i=Lb) is stored in (N) to be held, and proceeds to Step 200 where the H∞ processing will be made.

FIG. 5 shows the H∞ processing made at Step 200 in FIG. 4. After the band (i) is set as "1" at Step 201, the regulation $\Delta i(S)$ between the frequency transform function Qi(S) and the frequency transform function Gi(S) is computed according to $(Qi(S)-Gi(S))/Gi(S)$. In other words, a range of variation of the maximum plant to the nominal plant is computed. In the present embodiment, the regulation $\Delta i(S)$ is computed by multiplicative perturbation, while the variation may be computed by additive perturbation. Then, the program proceeds to Step 203 where a weighting function Wci(S) of a complementary sensitivity function is set, provided that $|\Delta i(j\omega)| \leq |Wci(j\omega)|$ is satisfied and that Wci(S)·Gi(S) is a proper transfer function. Next, a weighting function Wsi(S) of a sensitivity function is set at Step 204. The weighting function Wsi(S) is a scale for the follow-up characteristic, so that it is set in accordance with the follow-up characteristic up to a desired frequency domain.

On the basis of the frequency transform function Gi(S) of the nominal plant and the frequency transform function Qi(S) of the maximum plant, the weighting function Wsi(S) of the sensitivity function, and the weighting function Wci(S) of the complementary sensitivity function, the Riccati equation is computed to satisfy the assumption of Glover and Doyle, thereby to obtain the H∞ controller. In other words, a solution of minimizing a cost function weighted to an optimal regulator is the H∞. This computation is not performed on the real time basis, but programmed in advance. The details of the computation of the H∞ is disclosed in a CAD package on the market, such as "Robust Control TOOLBOX version 2.0", distributed by The MathWorks, Inc., Massachusetts, U.S.A., so that further explanation on the computation will be omitted.

Since the H∞ controller is a higher order system, it is necessary to reduce its order in modeling the frequency transform functions Gi(S), Qi(S) into the mathematical models, in practice. Then, an appropriate balanced realization is performed, so that the reduction is made by a bilinear transfer, for example. According to this method, however, a modeling error necessarily arises, to form a conservative controller. In the present embodiment, therefore, the frequency transform functions Gi(S), Qi(S) are divided into a plurality of bands (i.e., sub-bands) before the H∞ controller is obtained, and the H∞ controller is provided for each band to form a plurality of H∞ controllers in total (each controller is designated as CH∞i(S)).

Accordingly, the H∞ controller for each band CH∞i(S) is computed at Step 205. Then, it is determined at Step 206 whether the band (i) has reached to a predetermined band (N). If it has not reached to the band (N), the program proceeds to Step 207 where the band (i) is incremented, and Steps 202–205 are repeated. If it is determined at Step 206 that the band (i) has reached to the band (N), the program proceeds to Step 208 where the H∞ controller for each band CH∞i(S) is processed, in parallel. That is, in the first band (i=1), the regulation $\Delta 1(S)$ is computed on the basis of the frequency transform functions G1(S), Q1(S), and the weighting functions Ws1(S), Wc1(S) are set, respectively. Then, in the second band (i=2), the regulation $\Delta 2(S)$ is computed on the basis of the frequency transform functions G2(S), Q2(S), and the weighting functions Ws2(S), Wc2(S) are set. Consequently, the H∞ controllers CH∞1(S), CH∞2(S) are obtained, and the remaining controllers are obtained, as well.

Figure 11:
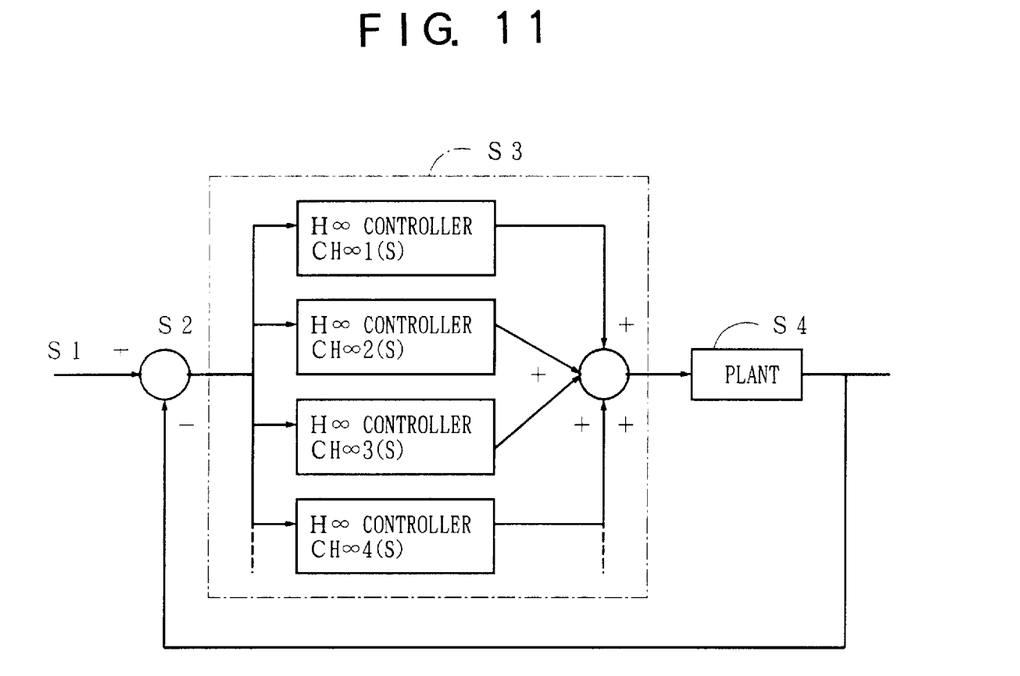
FIG. 11 is a block diagram of a H∞ controller for each band according to the present invention.
Figure 12:
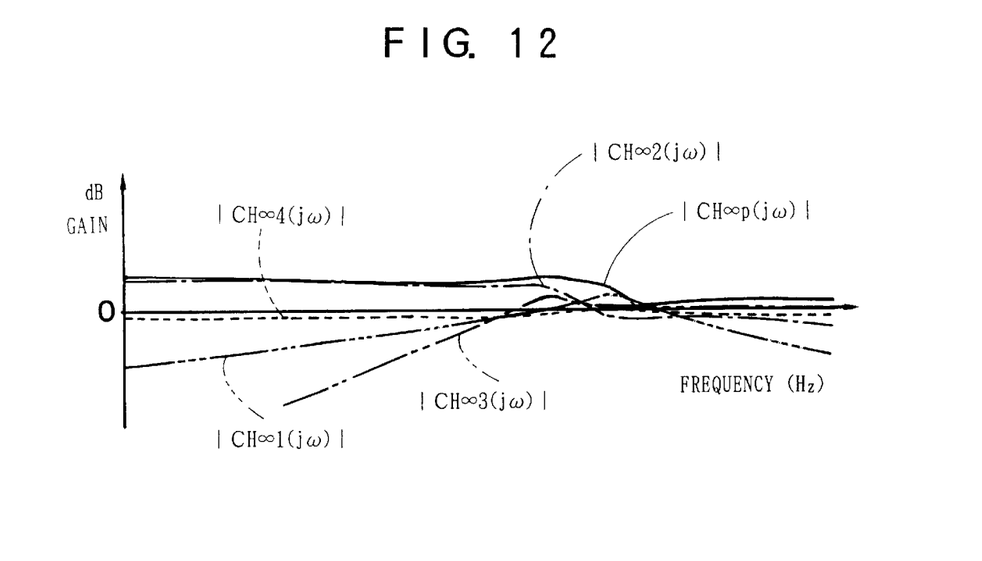
FIG. 12 is a gain diagram of the H∞ controller as shown in FIG. 11 and the diagram of it after the parallel processing was performed.
Figure 13:
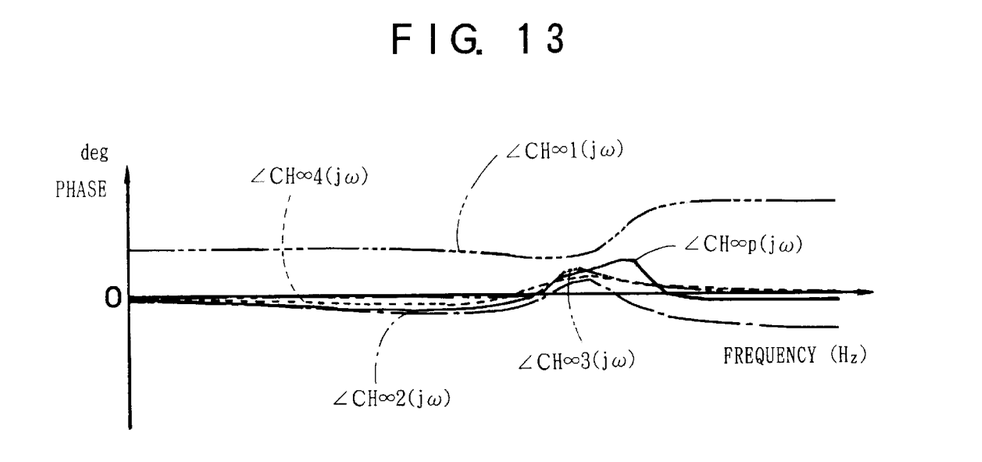
FIG. 13 is a phase diagram of the H∞ controller as shown in FIG. 11 and the diagram of it after the parallel processing was performed.

The H∞ controllers CH∞i(S), i=1 to n, are connected in parallel, and processed in parallel, as shown in FIG. 11 where the H∞ controllers CH∞1(S) to CH∞4(S) are set when i=1 to 4, for example. Consequently, the characteristics as shown by solid lines in FIGS. 12 and 13 are obtained, and an optimal H∞ controller which accurately reflects the characteristic of the plant is made. In FIG. 11, the plant S4 corresponds to the controlled system S4 as shown in FIG. 3, and S1 to S3 correspond to S1 to S3 in FIG. 3 respectively, where the section S3 in FIG. 11 is described from a different view point from the control section S3 in FIG. 3. Thus, the structure of the system as shown in FIG. 11 is applicable to various apparatuses other than the rear wheel steering control apparatus as shown in FIG. 2.

Thereafter, the program returns to the routine defined in the program in FIG. 4, where the PID control is performed at Step 300. At Step 300, the PID controller is made so as to approximate the one having the characteristics as shown in FIGS. 12 and 13. In the process performed at Step 300, the optimal reduction processing is made, considering the program capacity and computing time in total, as in the case where the bands are set to provide a plurality of H∞ controllers. At Steps 107 to 109 in FIG. 4, different bandwidths are provided for the frequency transform functions Gi(S), Qi(S) on the gain diagram. However, the frequency transform functions Gi(S), Qi(S) may be divided into a plurality of bands independently from each other, on the gain diagram and the phase diagram, respectively, and the bandwidths may be varied. In this case, the bandwidths may be compared between the gain diagram and the phase diagram to select the narrower one for use in the process, whereby the modeling can be made, holding a balance between shortening the processing time and obtaining higher accuracy of the process.

Figure 14:
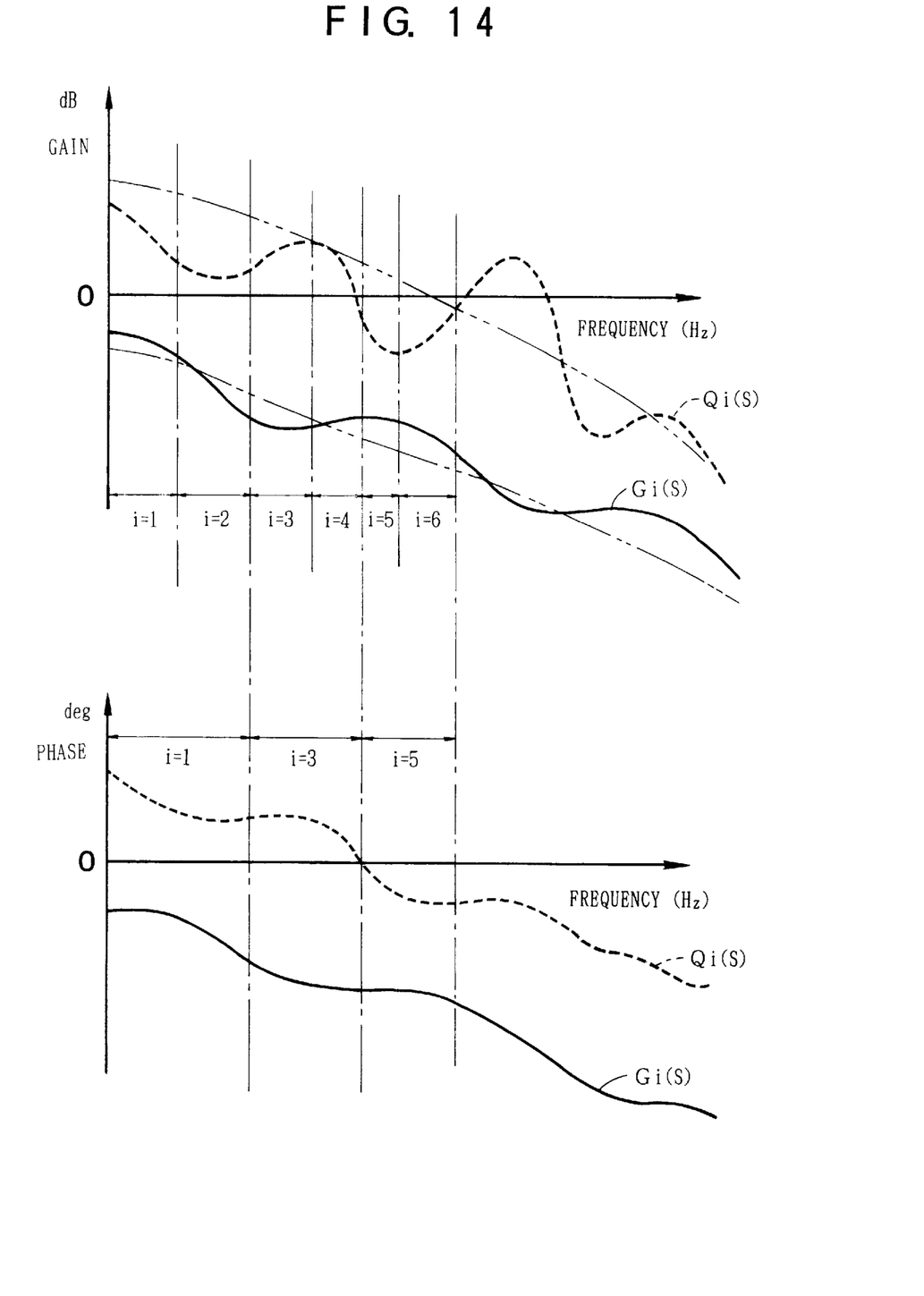
FIG. 14 is a graph for explaining determination of a bandwidth in the frequency characteristic according to an embodiment of the present invention.

FIG. 14 illustrates the same characteristics as shown in FIG. 7, but shows another method for determining the bandwidth in the case where the bandwidth on the gain diagram is different from the bandwidth on the phase diagram. For example, in case of i=1, the bandwidth on the gain diagram is narrower than that on the phase diagram, the former bandwidth is selected in FIG. 14. As a result, the bandwidth in FIG. 14 is determined only on the basis of the gain diagram. Supposing that the bandwidth on the phase diagram is narrower than that on the gain diagram in case of i=3, however, the bandwidth will be set on the basis of the phase diagram. Or, the bandwidth may be set on the basis of the phase diagram, even if it is broader than the bandwidth on the gain diagram, and later the bandwidth may be set again on the basis of the gain diagram in case of i=5. Thus, the bandwidth may be appropriately set according to the design conditions.

In the case where a design change is made to a part of the plant, a part of response waveform of the plant may be changed to alter the frequency transfer function in a certain band. In that case, it is preferable to modify only the H∞ controller for that band to re-design the H∞ controller fast. The present invention is applicable to various apparatuses, as is apparent from the structure of the system shown in FIG. 11. As an example of the controlled system with a lot of resonance points and anti-resonance points, an infinite dimensional system such as a cantilever must be of higher order response. According to the present invention, a plurality of H∞ controllers are made, so that the reduction can be performed to simplify the computation and shorten the processing time to a large extent. In combining the H∞ controllers with the classical control system, various control systems other than the aforementioned PID control system can be employed.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A stability control system for use in an automatic control system comprising:

a controlled system;

response characteristic measuring means for measuring a response characteristic of said controlled system;

frequency response computing means for processing the response characteristic measured by said response characteristic measuring means to obtain a standard frequency transfer function having a standard frequency characteristic, and a varied frequency transfer function having a frequency characteristic with a permissive variation to the standard frequency transfer function;

band division means for dividing the standard frequency transfer function and the varied frequency transfer function obtained by said frequency response computing means into a plurality of bands, respectively;

modeling means for mathematically approximating the standard frequency transfer function for each band divided by said band division means to obtain a standard approximate model for each band, and mathematically approximating the varied frequency transfer function for each band to obtain a varied approximate model for each band, respectively;

variation computing means for computing a variation of the varied approximate model to the standard approximate model for each band;

modern controller setting means for setting a modern controller for the variation in each band computed by said variation computing means, respectively, to provide a plurality of modern controllers;

parallel processing means for processing the plurality of modern controllers in parallel with each other; and actuating means for actuating said controlled system according to a result processed by said parallel processing means.

2. The stability control system as set forth in claim 1, wherein said frequency response computing means computes magnitude components and phase components of the standard frequency transfer function and the varied frequency transfer function, respectively, wherein said band division means divides the magnitude components of the standard frequency transfer function and the varied frequency transfer function into a first plurality of bands, and divides the phase components of the standard frequency transfer function and the varied frequency transfer function into a second plurality of bands, wherein said modeling means mathematically approximates the magnitude component and phase component of the standard frequency transfer function for each band to obtain the standard approximate model of each component, and mathematically approximates the magnitude component and phase component of the varied frequency transfer function for each band to obtain the varied approximate model of each component, respectively, and wherein said modern controller setting means sets the modern controller according to the variation of the varied approximate model of each component to the standard approximate model of each component in one of the first plurality of bands and the second plurality of bands.

3. The stability control system as set forth in claim 2, wherein said modern controller setting means sets the modern controller in accordance with the variation of the varied approximate model of each component to the standard approximate model of each component in a relatively narrower band between each of the first plurality of bands and each of the second plurality of bands.

4. The stability control system as set forth in claim 3, wherein said actuating means includes a PID controller, and actuates said PID controller according to the result processed by said parallel processing means.

5. The stability control system as set forth in claim 4, wherein said stability control system is installed in an automotive vehicle, and wherein said controlled system is a rear wheel steering control apparatus for steering rear wheels in response to steering operation of front wheels of said automotive vehicle.

* * * * *